March 26, 1946.  J. W. KELLY  2,397,269

COMPOSITE VALVE MEMBER

Filed Oct. 19, 1943

Inventor
JOHN. W. KELLY
By R. S. Berry
Attorney

Patented Mar. 26, 1946

2,397,269

UNITED STATES PATENT OFFICE 2,397,269

COMPOSITE VALVE MEMBER

John W. Kelly, La Canada, Calif., assignor to Adel Precision Products Corp., a corporation of California Application October 19, 1943, Serial No. 506,913

2 Claims. (Cl. 251—159)

This invention relates to and has for an object the provision of a valve member which is especially designed for controlling the flow of low viscosity fluid having high penetrating qualities, for example, the alcohol-containing anti-icing fluid employed in aircraft, and embodies features of construction and an arrangement of parts whereby leakage of fluid past the valve when seated is prevented, costly machining operations heretofore required to make ground or lapped seating surfaces are eliminated and impairment of the seating and sealing surfaces due to electrolytic and other attack is prevented.

Another object of my invention is to provide a valve member of the character described in which a part thereof is formed of a yieldable elastic material which is chemically inert to the fluid under control thereby, for example synthetic rubber, and forms a supplemental seating and sealing surface assuring the leak proof qualities essential to successful performance of a valve member employed for the purposes described.

A further object of my invention is to provide a composite valve member of the character described which includes a hard disk-like body portion of metal or other suitable hard material having a seating surface on one side, and a cap-like member of yieldable, elastic material such as synthetic rubber combined with the body portion so that said member presents an annular sealing portion surrounding the body portion and projecting axially therefrom to contact the valve seat and be placed under compression when said seating surface seats on said valve seat, thereby assuring an effective seal in case of any improper seating.

Another object of my invention is to provide a composite valve member such as described in which the hard disk-like body portion and the yieldable elastic cap member are especially constructed so as to interlock and remain in properly united relation with the cap member enclosing and covering and protecting all surfaces of the body portion except that side of the latter which contacts the seat for the valve member.

Yet another object of my invention is to provide a valve such as described which may be produced at a lower cost than valves heretofore made for the purpose aforementioned and will operate reliably over a longer period of time without requiring servicing or replacement, due to the elimination of costly machining operations heretofore required in making such valves, and the fact that the protective coating usually applied where metal is used for the body of the valve to prevent electrolytic and other attack is not removed as no grinding or lapping of the metal body to provide a seating surface thereon is required because of the seating and sealing action of the chemically inert and yieldable elastic member forming a part of the valve.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

As shown in the accompanying drawing, one form of composite valve member embodying my invention generally includes a circular disk-like body portion 1 made of metal or some other suitable hard material, a stem 2, and a member 3 of yieldable elastic material such as synthetic rubber combined with the body portion to provide a leak proof seal and a supplemental seating surface surrounding the body portion.

Figure 1:
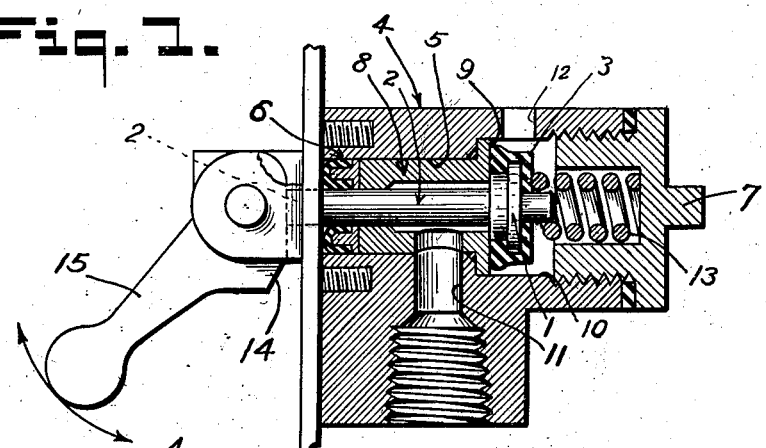
Fig. 1 is a sectional view of a valve member embodying my invention; as when incorporated in an anti-icing control valve, the valve being shown as seated.
Figure 2:
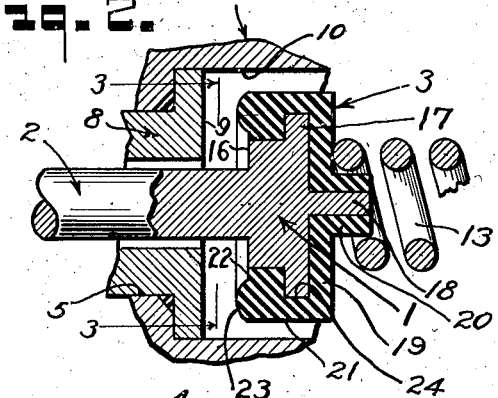
Fig. 2 is an enlarged fragmentary sectional view of the valve member as when unseated.
Figure 3:
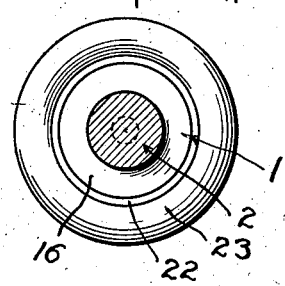
Fig. 3 is a sectional view taken on the line 3—3 of Fig. 2.

My improved valve is subject to effective use in an anti-icing control valve of the type shown in Fig. 1 wherein a valve housing 4 is formed with a bore 5 closed at one end by means of a sealing means 6 and at its other by means of a plug 7. A tubular seat member 8 is fitted at the bore 5 and provided at one end with an annular seat 9 presented to an enlarged or valve chamber portion 10 of the bore 5. The valve member of my invention is mounted in the chamber 10 to seat against the seat 9 so as to control the flow of anti-icing fluid relative to ports 11 and 12 opening into the bore on opposite sides of the valve seat 9. The valve member is closed by means of a spring 13 engaged at one end in the plug 7 and its other end with the valve member. A cam portion 14, part of which is shown in Fig. 1, is formed on the inner end of the pivoted valve operating handle 15 so as to engage the stem of the valve member to seat and unseat it on appropriate movement of the handle.

As here shown the disk-like body portion 1 of the valve member is provided on the side from which the stem 2 extends with an annular substantially flat seating surface 16 adapted to engage the valve seat 9. Adjacent its other or outer side, the body portion 1 is formed with a radially extended annular flange 17 for interlocking the body portion with the member 3. A pin-like projection 18 extends from the outer side of the body 1 and serves as a keeper for the spring 13.

The yieldable sealing member 3 is preferably made in the form of a flanged circular cap in which the disk-like body portion 19 thereof lies against the outer face of the body portion 1. Projecting outwardly from this outer face of the portion 19 is a tubular boss 20 fitted over the projection 18. One end of the spring 13 surrounds this boss and rests against the portion 19 of the member 3.

Figure 4:
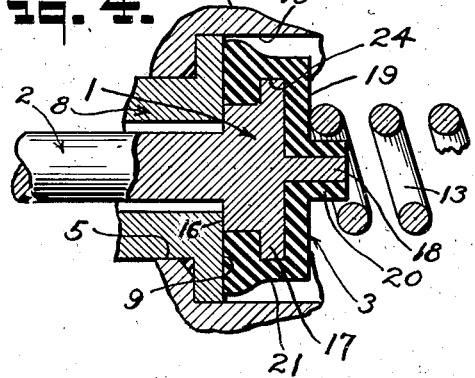
Fig. 4 is an enlarged sectional view corresponding to Fig. 2 but showing the valve member seated.

The annular peripheral flange 21 of the member 3 surrounds the valve body 1 in close contact with the periphery thereof and has its outer end formed with a narrow annular flat portion 22 substantially coplanar with the seating surface 16. Next adjacent the portion 22 is an annular sealing portion 23 in the form of a rib projecting axially outwardly from the portion 22 and seating surface 16 to contact the valve seat 9 in advance of said seating surface. The outer face of the sealing rib 23 is curved or rounded and said rib will be compressed between the valve seat and flange 17 and forcibly seated on the valve seat 9 when the seating surface 16 comes into engagement with said valve seat thereby providing an effective supplemental seating and sealing member on the valve and insuring a leak proof seal as will be apparent with reference to Fig. 4. The rib 23 will expand radially outward only and present a flat surface which is substantially coplanar with the surface 22 and seating surface 16 when the valve is seated as clearly shown in Fig. 4, thereby providing a comparatively wide annular seating and sealing surface coplanar with the seating surface 16 so that in the event the latter or the valve seat 9 is impaired and does not seat properly a leak proof seal is insured by reason of the sealing rib 23.

An annular recess 24 is formed in the inner wall of the flange 21 to receive the annular flange 17 on the valve body member, which flange 17 is forced into said recess whereby the two sections of the composite valves are interlocked and securely held together.

It should be noted that the elastic part of the valve, in order to function as a cap, is necessarily provided with the flange portion 21, the sealing rib 23 being carried by said flange portion.

It is important to note that my composite valve makes it unnecessary to provide a ground or lapped seating surface on the metal or other hard valve portion 1 due to the annular sealing surfaces afforded by the yieldable elastic member 3, thereby materially reducing the cost of the valve member and making it subject to longer life without requiring servicing or replacement.

Figure 5:
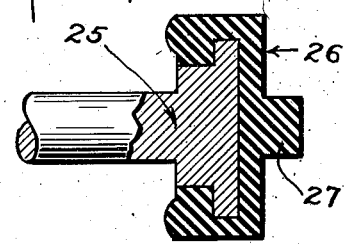
Fig. 5 is a fragmentary sectional view of a modified form valve member embodying my invention.

In Fig. 5 a modified form of valve embodying my invention includes a valve body member 25 and a synthetic rubber cap or sealing member 26 identical with the body and cap shown in Figs. 1 to 4 inclusive except that the projection 18 on the valve body member is omitted and a spring keeper boss 27 is formed as a solid integral part of the member 26. This form of valve functions in the same manner as the first described form.

I claim:

1. In a composite valve, a valve body portion having a seating surface on one side thereof adapted to engage a valve seat, and a yieldable elastic member carried by said body and having a peripheral flange surrounding said body, said flange carrying an annular rib projecting axially from said seating surface for engaging said valve seat in advance of said seating surface and becoming compressed when said seating surface comes into seated contact with the valve seat, said yieldable elastic member being in the form of a cap in which said body portion is mounted; and a boss on said yieldable elastic member serving as a spring keeper, said boss projecting from that side of the valve which is opposite to its seating surface.

2. In a composite valve, a valve body portion having a seating surface on one side thereof adapted to engage a valve seat, a yieldable elastic member carried by said body and having a peripheral flange surrounding said body, said flange carrying an annular rib projecting axially from said seating surface and becoming compressed when said seating surface comes into seated contact with the valve seat, said yieldable elastic member being in the form of a cap in which said body portion is mounted, a boss on said yieldable elastic member serving as a spring keeper; and a pin-like projection on said body extending through said boss, said boss projecting from that side of the valve which is opposite to its seating surface.

JOHN W. KELLY.